Figure 1A:
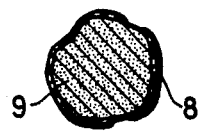

United States Patent [19]

Ullrich

[11] 4,095,995

[45] Jun. 20, 1978

[54] POROUS AGGREGATE FOR LIGHT-WEIGHT CONCRETE

[75] Inventor: Fritz Ullrich, Obersulm-Eschenau, Germany

[73] Assignee: Chemotechnik Gesellschaft fur Baustoffchemie mbH & Co., Germany

[21] Appl. No.: 526,933

[22] Filed: Nov. 25, 1974

[30] Foreign Application Priority Data

Nov. 27, 1973 Germany .............................. 2358913

[51] Int. Cl.$^2$ ................................................ C04B 7/02
[52] U.S. Cl. ................................ 106/308 Q; 106/90; 106/97; 260/37 AL
[58] Field of Search .................. 106/308 B, 308 Q, 86, 106/90, 97; 260/37 AL

[56] References Cited

U.S. PATENT DOCUMENTS

| | | | |
|---|---|---|---|
| 2,592,345 | 4/1952 | Schnell | 106/86 |
| 2,650,171 | 8/1953 | Schaaf | 106/86 |
| 3,027,266 | 3/1962 | Wikne | 106/86 |
| 3,131,075 | 4/1964 | Brooks | 106/90 |
| 3,759,729 | 9/1973 | Fahn | 106/71 |
| 3,812,076 | 5/1974 | Previte et al. | 260/37 AL |
| 3,847,630 | 11/1974 | Compernass et al. | 106/90 |
| 3,956,230 | 5/1976 | Gaylord | 260/37 AL |

*Primary Examiner*—Winston A. Douglas
*Assistant Examiner*—J. V. Howard
*Attorney, Agent, or Firm*—Craig & Antonelli

[57] ABSTRACT

To prevent the escape of water into the porous aggregate of light-weight concrete at the time of pumping, the individual particles of the additive, which, with cement slurry, forms a gel-like protective layer, which is scarcely permeable to water, for a period of time, and which facilitates a bond between the aggregate and the cement. The protective layer can be produced by spraying a solution, in particular an aqueous solution of the additive into the aggregate particles, which are heated to a temperature above the boiling point of the solvent, and by evaporating the solvent.

30 Claims, 3 Drawing Figures

U.S. Patent  June 20, 1978  4,095,995

POROUS AGGREGATE FOR LIGHT-WEIGHT CONCRETE

The invention relates to a porous aggregate for light-weight concrete.

Light-weight concrete is a concrete whose binding agent consists of cement glue and whose aggregate consists of particles of a low gross density. Expanded clay or expanded shale is frequently used as aggregate. Depending on the desired gross density of the light-weight concrete, which is generally between approximately 1.2 and 2 (the gross density of normal concrete is 2.4), a greater or lesser amount of natural sand may be added to the light-weight concrete.

In the case of normal concrete, whose aggregate consists of a gravel and sand mixture, gravel, chippings and the like, there are virtually no problems of segregation during processing and compacting, since the differences in gross density between the binding agent and aggregate are so slight that in general, the internal friction of the fresh concrete mixture is sufficient to prevent disturbing segregation. In the case of light-weight concrete, it is more difficult to prevent this segregation, since the light-weight aggregate does not have even half the gross density of the cement glue used as binding agent. Therefore, in order to effectively prevent segregation, it must be ensured that the fresh concrete has high internal frictional resistance, which may be achieved in that the light-weight concrete is produced with the lowest possible content of mixing water, i.e. with the maximum possible rigid plastic consistency. However, a rigid plastic light-weight concrete of this type cannot be pumped, because it does not contain sufficient water or cement glue in order to be soft and able to move as is necessary for conveyance by pipe line over long distances. On the other hand, if the light-weight concrete is soft plastic, pasty or even able to flow, then the internal friction is no longer sufficient and the light-weight concrete separated due to "floating" of the light aggregate to such an extent that normal manufacture and compacting is no longer possible. The floating may be so considerable that it is not even possible to mix the light-weight concrete in a normal manner.

It is known to add an additive to the cement slurry of such soft plastic light-weight concretes or to the finished light-weight concrete, namely a water soluble linear polyethylene oxide of high molecular weight, known by the name UCAR 4 C, of the firm Union Carbide Corporation U.S.A., in order to prevent the constituents of varying weight of the light-weight concrete from separating. The molecules of this substance have a molecular weight of up to 5 million. The said substance is sold in the German speaking part of Europe by the firm Chemotechnik Gesellschaft fer Baustoffchemie mbH & Co., 7101 Abstatt, under the trade name UCR.

The action of said additive preventing separation, is based on the fact that the viscosity of water is increased by this additive. It becomes viscous, its adhesion to the cement particles and to the particles of the aggregate becomes greater. The hardening and strength of the concrete is not impaired by this additive. With a dose of approximately 60 to 100g. per 1 cubic meter of light-weight concrete, the cement glue is so ductile and viscous that even with a soft to flowing consistency, there is no noticeable segregation of the light-weight concrete. It is also known that due to this additive, a concrete mixture becomes better able to slide, so that certain light-weight concrete mixtures which are able to flow, may be pumped through pipe lines. In the said light-weight concrete mixtures, whose gross density has a value of approximately 1.5 or a greater value, hardening at the time of pumping is prevented by this additive. The danger of hardening is based on the fact that the aggregate is porous. These pores are so fine that the aggregate only absorbs small quantities of moisture when it is normally wetted with water or cement glue. However, if a concrete produced with light-weight aggregate without the above-said additive is pumped through pipe lines and exposed to customary pressures of approximately 5 to 7 atmospheres, then approximately 60 to 100 liters of water per cubic meter of concrete pass abruptly from the cement glue into the aggregate, the concrete hardens correspondingly and the internal friction of the concrete as well as its friction on the pipe wall becomes so high that the concrete pillar can no longer be moved with any pressure which is available in practice. However, hitherto, it was impossible to convey light-weight concretes with a lower gross density than 1.5 with the assistance of an additive, through pipe lines, because, on the one hand, in the case of the above-said dosing of approximately 60 to 100g. additive per cubic meter of light-weight concrete, hardening could not be prevented and on the other hand, because due to an increase in the amount of additive added, hardening can be prevented, but due to the additive, the concrete mixture becomes too viscous and sticky so that for this reason, it can no longer be pumped.

The possibility of pumping light-weight concretes with a gross density of 1.5 or more, can be explained in that light-weight concretes of this type have a high proportion of nonporous aggregates, for example river sand. Due to this, the surface of the porous aggregate, present in a certain quantity of light-weight concrete, which is available for absorbing water, is reduced with respect to concretes of lighter weight with a higher proportion of porous aggregate. In the said heavier light-weight concretes, water likewise passes into the porous aggregate, however, owing to the smaller overall surface of the porous aggregate and to the smaller quantity of aggregate, this does not result in so great a loss of water that hardening may occur.

The extent to which water passes into the porous aggregate at the time of pumping depends on several factors, inter alia on the ratio between the surface and volume of the individual particles of the porous aggregate, on the pore size and on how large a proportion of the pores contained inside the particles of the aggregate are in direct connection with the surface, i.e. on the open pore condition. The said values may differ with various porous aggregates.

It has already been attempted to prevent the escape of water into the porous aggregate in that the particles of the aggregate were sealed by thermoplastic coatings or made highly water-repellent by spraying with silicone resin solutions. However, both these measures deteriorate the bond required for adequate strength of the concrete, between the binding agent and surface of the aggregate, to such an extent that all such attempts had to be abandoned without success.

It is the object of the invention to find a possibility of pumping even light-weight concrete with a lower density than approximately 1.5.

The invention has recognised that this object may be solved by a preliminary treatment of the aggregate with the additive, however, it is not restricted to the use of the said additive. The invention consists in that the individual particles of the aggregate are coated at least partially by an additive, which, with cement slurry, for a period of time, forms a gel-like protective layer, which is scarcely permeable to water, which facilitates a bond between the aggregate and the cement.

The advantage of the invention consists in that on the one hand, due to the gel-like protective layer, an excessive passage of water into the inside of the particles of the aggregate is prevented and, on the other hand, that due to the fact that the additive forms a gel-like mass with the cement slurry, a secure bond between the surface of the particles of the aggregate and the cement is facilitated in the solidified concrete. The quantity of water passing into the inside of the particles of the aggregate at the time of pumping amounts for example to at the most only 10 to 25 liters per cubic meter of light-weight concrete. A further advantage consists in that it is not necessary to greatly increase the proportion of an additive mixed into the concrete for preventing segregation, but the additive added for this purpose is added in a relatively small dose to the mixing water or to the cement of the concrete in a manner known per se, whereas the additive applied to the particles of the aggregate act solely in the immediate proximity of the particles and does not substantially alter the flow properties of the concrete. It is not absolutely necessary that the same additives are used for covering the particles of the aggregate and for preventing segregation of the concrete, however, it is necessary that when using different additives for the aforesaid purposes, no unfavourable interaction of the properties of these substances occurs. However, in most cases it is appropriate to use the same additive both for covering the particles of the aggregate as well as for preventing segregation.

After the mixing of the light-weight concrete, the gel-like protective layer should maintain its effect until the pumping operation has normally ended. In many cases it is appropriate if, in addition to this, the gel-like protective layer lasts until the concrete has been conveyed to its ultimate place of use and if necessary has been compacted. It is thus prevented that due to a uniform distribution of the additive in the cement glue, the latter becomes too viscous. The protective layers may lose their effect after a period of approximately 20 to 60 minutes.

It is not absolutely necessary that the covering of the particles forms an uninterrupted layer in the dry state, but the covering may have gaps or may be applied to the particles of the porous aggregate in the form of small or larger discontinuous areas. When the protective layer assumes its gel-like state, it swells, due to which, any gaps in the covering which are present in the dry state are at least partly closed. In addition, the formation of a covering from a gel has the advantage that the particles covered in this way have a very much lower frictional resistance than without this covering, so that pumping the light-weight concrete through pipe lines is also facilitated due to this.

Thus, the additive forming the covering is not uniformly distributed in the cement glue from the beginning, as is known for preventing segregation, but is located in a gel-like form in a very high concentration in the immediate vicinity of the surface of the porous aggregate, due to which it is achieved that even at high pressures, only little water penetrates the porous particles of the aggregate even when the gross density of the light-weight concrete is very low, i.e. below approximately 1.5. If there were such a high concentration of the additive in the entire cement glue, then this concrete could no longer be processed. In the dry state, the covering of the particles may be very thin, for example 1/1000mm.

The protective layer consisting of the additive, on the particles of the aggregate, may be applied in any manner, if it is solely ensured that during the production of the concrete mixture, this additive is not immediately loosened from the particles of the aggregate and distributed in the cement glue. For example, the protective layer may be formed by a precipitate of a solution or by normal adhesion. However, in a preferred embodiment of the invention, it is provided that the additive is melted on the particles of the aggregate. The adhesion of the additive is increased in this way.

In one embodiment of the invention, the additive consists of a water-soluble polyethylene oxide having a high molecular weight, in particular of the afore-mentioned polyethylene oxide of the firm Union Carbide Corporation, U.S.A., known under the name UCAR 4 C. Although the covering of the particles consisting of the said substance dissolves virtually immediately on mixing the concrete, whereby it then assumes the gel-like state, the very advantageous property becomes apparent that the gel-like protective layer is maintained even in the case of stresses occurring during the mixing of the concrete and during pumping.

The invention also relates to a method for producing a porous aggregate according to the invention, in this method, the invention consists in that a solution, in particular an aqueous solution of the additive is sprayed on the particles of the aggregate, which are heated to a temperature above the boiling point of the solvent and that the solvent is allowed to evaporate.

The advantage of the method according to the invention consists in that it makes it possible to apply an adhesive layer of the additive, of easily controllable thickness, to the particles of the porous aggregate in a simple manner. The solvent, in particular water, in this case serves for applying the additive to the particles in a sufficiently fine distribution, since only relatively small quantities are necessary for adequate effectiveness of the additive. If the protective layer is to be melted on the particles, then the temperature of the particles is above the melting point of the additive, so that an adhesive bond with the surface of the particles of the aggregate can be achieved by at least brief melting of the additive. The said polyethylene oxide has a melting point of 60° to 80° C. When it comes into contact with the additive, the aggregate appropriately has a higher temperature than is absolutely necessary for melting the additive. If water is used as the solvent, it is appropriate if the particles of the aggregate have a temperature of more than 100° C in order that the water evaporates as quickly as possible. On the other hand, the additive should not be heated so considerably that its desired properties are impaired or even destroyed. For this reason, the said polyethylene oxide should only be heated to approximately 150° C. However, if the said substance is dissolved in water, then it is possible to spray this solution onto the particles of aggregate which have a temperature higher than 150° C, preferably approximately 180° to 190° C, since the aggregate is cooled during spraying, the water thus evaporating, but still retains a temperature which is sufficient to melt the polyethylene oxide applied to the surface of the aggregate, a very thin covering of uniform density of the aggregate particles with a film of water-soluble polyethylene oxide thus being achieved. In the operation described, it is possible that the additive is deposited not only on the surface of the aggregate particles, but to a certain extent also penetrates the pores of the particles. The maximum temperature to which the polyethylene oxide may be exposed, is controlled depending on the quantity of solution which is used for a certain quantity of aggregate. A temperature of approximately 140° to 150° C has proved advantageous.

Instead of spraying a solution of the additive onto the aggregate, it is also possible to spray the additive in the form of finely divided dust, onto the aggregate heated to above the melting point. It is also possible to spray the additive onto the aggregate without using a solvent in the molten state, as a mist having varying degrees of fineness, which aggregate in this case does not need to have the above-described high temperatures.

Any aggregate suitable for the production of light-weight concrete, for example pumice, can be considered as a porous aggregate. However, in a preferred embodiment of the method according to the invention, the uncoated aggregate is produced by heating expanded clay and/or expanded shale and the additive is applied during the cooling of the expanded material. The production of porous aggregate from expanded clay or expanded shale takes place in known manner due to the fact that these materials are heated to sufficiently high temperatures, normally above 1,000° C. In this case, these materials obtain a porous structure. The advantage of this embodiment of the method according to the invention consists in that the application of the additive to the aggregate may take place without difficulties when the aggregate has reached the temperature required for applying the additive, after the cooling operation following the heating. Thus, in this case it is unnecessary to heat the aggregate expressly and therefore energy is saved in this embodiment of the method.

In one embodiment of the method according to the invention, the aggregate is mixed thoroughly after spraying on the additive. Due to this, it is advantageously achieved that when the individual particles are not uniformly covered with the additive at the time of spraying, a more uniform distribution of the additive on the surface of each individual particle and also over all the particles of the aggregate is achieved by thoroughly mixing the aggregate.

Figure 1B:
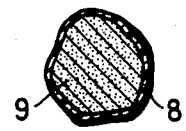

The invention is described briefly hereafter with reference to the drawings. In the drawings, FIGS. 1a and 1b show enlarged cross sections through a particle of the aggregate covered by a protective layer having gaps or being uninterrupted, respectively; and FIG. 2 shows schematically an arrangement for producing the protective layer for the aggregate, using a revolving tubular furnace.

Figure 2:
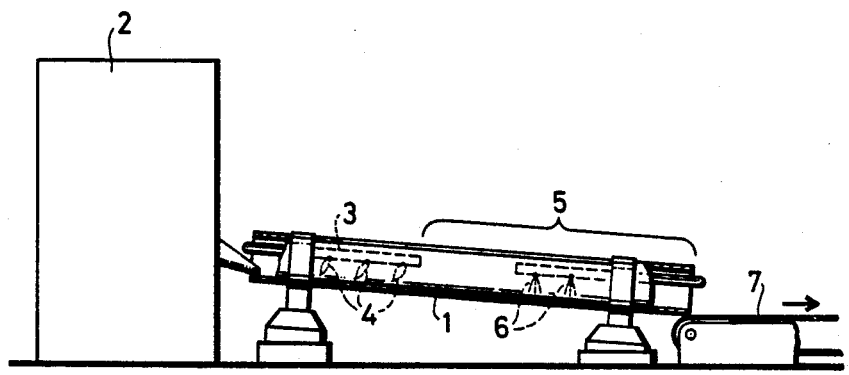

Referring now to FIG. 2, clay or slate is filled into the left-side open end of a continuously operating revolving tubular furnace 1 by means of a filling apparatus 2. In the tubular furnace 1 the clay or slate is expanded by heating at a temperature of approximately 1200° to 1400° C. The heating is effected by an oil-burner 3 positioned inside the left-side part (FIG. 2) of the tubular furnace 1. The flames of the oil-burner 3 are indicated at 4. The axis of the revolving tube of the furnace is inclined aganist the horizontal plane. After being expanded the material is cooled in the so-called cooling part 5 of the revolving tube. In one region of the cooling part 5, in which the aggregate is cooled to approximately 180° C, an approximately 1% solution of UCAR 4 C in water is sprayed at 6 onto the porous aggregate, which already has a grain size suitable for light-weight concrete, and the aggregate is mixed thoroughly within that part of the revolving tube which follows the point where the spraying takes place. The water of the solution evaporates, the additive is deposited in liquid form on the aggregate and after cooling forms a relatively uniform, very thin film around the individual particles of the aggregate. The coated aggregate leaves the tubular furnace at the lower, right-side end and is removed by suitable means, for example a band-conveyor 7. In FIG. 1a and 1b, for the sake of clearness, the thickness of the covering 8 has been exaggerated in relation to the diameter of the particle 9. To produce the light-weight concrete, this aggregate is mixed with cement and, if necessary, with other aggregates. Then, the mixing water is added and approximately 60 to 100 g UCAR 4 C per cubic meter of light-weight concrete is added to the cement or mixing water to prevent segregation.

Any normal light-weight concrete which is produced with the porous aggregate according to the invention may be pumped reliably and without disturbances. This is also true when the particles of the aggregate do not have a substantially round shape, but rather an angular shape, as is frequently the case with porous aggregates.

The application of a covering consisting of the additive, to the particles of a porous aggregate is not only advantageous in light-weight concretes having a gross density less than approximately 1.5, because the latter can be pumped due to this, but also in light-weight concretes with a greater gross density. In particular, it is already known to convey these light-weight concretes in pipe lines by pumping. However, if the additive forms the covering for the particles, then a substantially smaller quantity of additive is necessary for achieving the desired effect, than in the case of mixing it into the light-weight concrete, because the covering ensures an increased concentration of the additive in the immediate vicinity of the surface of the particles and therefore the additive is located from the beginning at a point where it is most needed.

The invention makes it possible to use light-weight concrete even in civil engineering and due to this allows great economies. In structures of this type, concrete work is generally being carried out continuously and large quantities of concrete are required continuously, which can be conveyed rationally by means of pumps and pipe lines. Now, since it is possible to erect buildings of this type from light-weight concrete, owing to the reduction in weight in contrast to normal heavy concrete, reduced costs for foundations, reinforcement and shuttering result.

I claim:

1. Porous aggregate for light-weight concrete, characterized in that the individual particles of the aggregate are covered at least partly by a dry additive, which, with a cement slurry, forms a gel-like protective layer scarcely permeable to water, said protective layer facilitating a bond between the aggregate and the cement, said additive being a water-soluble polyethylene oxide of high molecular weight.

2. Aggregate according to claim 1, characterised in that the additive is melted onto the aggregate.

3. A material for forming light-weight concrete comprising a porous aggregate suitable for the production of light-weight concrete and composed of a plurality of particles of aggregate, each individual particle of aggregate being at least partially covered with a dry layer of a water-soluble polyethylene oxide having a molecular weight sufficient to form a gel-like protective layer scarcely permeable to water when contacted with a cement slurry.

4. The material of claim 3 wherein said particles of aggregate are produced by heating expanded clay, expanded shale or both.

5. The material of claim 3 wherein the thickness of the additive coating on each individual particle of aggregate is about 0.001mm.

6. The material of claim 3 wherein said particles of aggregate are formed from pumice.

7. The material of claim 3 wherein said polyethylene oxide has a melting point of about 60° to 80° C.

8. In a composition for forming a light-weight concrete comprising a mixture of a cement slurry and a porous aggregate, the improvement wherein each individual particle of said porous aggregate is at least partially covered with gel-like protective layer scarcely permeable to water formed from a water-soluble polyethylene oxide.

9. The composition of claim 8 wherein the amount of porous aggregate in said composition is sufficient so that the density of the concrete obtained when said composition dries is less than about 1.5gm/cc.

10. The composition of claim 8 wherein said porous aggregate is produced by heating expanded clay, expanded shale or both.

11. The composition of claim 8 wherein said porous aggregate is pumice.

12. The composition of claim 8 wherein the amount of gel-like protective layer on each individual particle of porous aggregate is sufficient so that the thickness of said water-soluble polyethylene oxide on each individual particle of porous aggregate when in a dry state is about 0.001mm.

13. The composition of claim 8 wherein said water-soluble polyethylene oxide has a melting point of about 60° to 80° C.

14. Composition of claim 8 wherein said composition further contains 60 to 100 grams of a segregation-preventing agent per cubic meter of said composition, said segregation-preventing agent comprising a water-soluble polyethylene oxide have a melting point between about 60° to 80° C.

15. In a process for forming a porous aggregate for use in the production of light-weight concrete in which clay, shale or both are heated to a temperature of at least about 1000° C. to form a porous aggregate and the porous aggregate is thereafter cooled to ambient, the improvement wherein said porous aggregate is coated during cooling thereof with a solution of a water-soluble polyethylene oxide.

16. The process of claim 15 wherein said polyethylene oxide forms a dry coating at ambient conditions, said dry coating forming on said porous aggregate a gel-like protective layer scarcely permeable to water when contacted with a cement slurry.

17. The process of claim 16 wherein said polyethylene oxide has a melting point of about 60° to 80° C.

18. The process of claim 17 wherein said porous aggregate is coated with said polyethylene oxide at a temperature above the melting point of said polyethylene oxide.

19. The process of claim 18 wherein said porous aggregate is coated with said polyethylene oxide at a temperature below the decomposition temperature thereof.

20. The process of claim 19 wherein said polyethylene oxide aggregate is applied in a form of an aqueous solution, said aqueous solution being applied to said porous aggregate at a temperature of more than 100° C.

21. The process of claim 20 wherein said aqueous solution is applied to said porous aggregate at a temperature of about 180° to 190° C.

22. The process of claim 18 wherein said polyethylene oxide is applied to said porous aggregate at a temperature of about 140° to 150° C.

23. A method for producing an additive covering for the aggregate particles according to claim 1, comprising spraying a solution of the additive onto the aggregate particles which are heated to a temperature above the boiling point of the solvent of the solution whereby the solvent is evaporated and aggregate particles individually covered at least partly by the additive are produced.

24. A method according to claim 23 further comprising mixing the aggregate particles individually covered at least partly by the additive to facilitate a uniform distribution of the additive on a surface of the individual particles.

25. Method according to claim 23, characterised in that the uncoated aggregate is produced by heating expanded clay, expanded shale or both and the additive is applied during the cooling of the expanded material.

26. Method according to claim 25, characterised in that the aggregate is mixed thoroughly after spraying.

27. Method according to claim 23 wherein said solution is an aqueous solution.

28. Porous aggregate for light-weight pumpable concrete characterized in that the individual porous particles of the aggregate are covered at least partially by an adhesive solid layer of an additive which in the presence of water converts to a gel-like layer which retards the absorption of water of a cement slurry by the porous aggregate particles under a pumping pressure, thereby facilitating pumping of the concrete by reducing the frictional resistance of the porous aggregate particles and preventing hardening of the concrete, the additive being further characterized in that when converted to the gel-like layer on the porous particle surface, the gel-like layer remains contiguous to the porous particle surface during a time of pumping of concrete containing the porous aggregate particles and forms a gel-like mass with the cement slurry facilitating secure bonding between the surface of the porous aggregate particles and the cement.

29. A material for forming a light-weight pumpable concrete comprising porous aggregate particles suitable for the production of light-weight concrete characterized in that the individual porous particles of the aggregate are covered at least partially by an adhesive solid layer of an additive which in the presence of water converts to a gel-like layer which retards the absorption of water of a cement slurry by the porous aggregate particles under a pumping pressure, thereby facilitating pumping of the concrete by reducing the frictional resistance of the porous aggregate particles and preventing hardening of the concrete, the additive being further characterized in that when converted to the gel-like layer on the porous particle surface, the gel-like layer remains contiguous to the porous particle surface during a time of pumping of concrete containing the porous aggregate particles and forms a gel-like mass with the cement slurry facilitating secure bonding between the surface of the porous aggregate particles and the cement.

30. In a composition for forming a light-weight pumpable concrete comprising a mixture of a cement slurry and a light-weight aggregate, the improvement wherein the individual porous particles of the aggregate are covered at least partially by an adhesive solid layer of an additive which in the presence of water converts to a gel-like layer which retards the absorption of water of a cement slurry by the porous aggregate particles under a pumping pressure, thereby facilitating pumping of the concrete by reducing the frictional resistance of the porous aggregate particles and preventing hardening of the concrete, the additive being further characterized in that when converted to the gel-like layer on the porous particle surface, the gel-like layer remains contiguous to the porous particle surface during a time of pumping of concrete containing the porous aggregate particles and forms a gel-like mass with the cement slurry facilitating secure bonding between the surface of the porous aggregate particles and the cement.

* * * * *